UNITED STATES PATENT OFFICE.

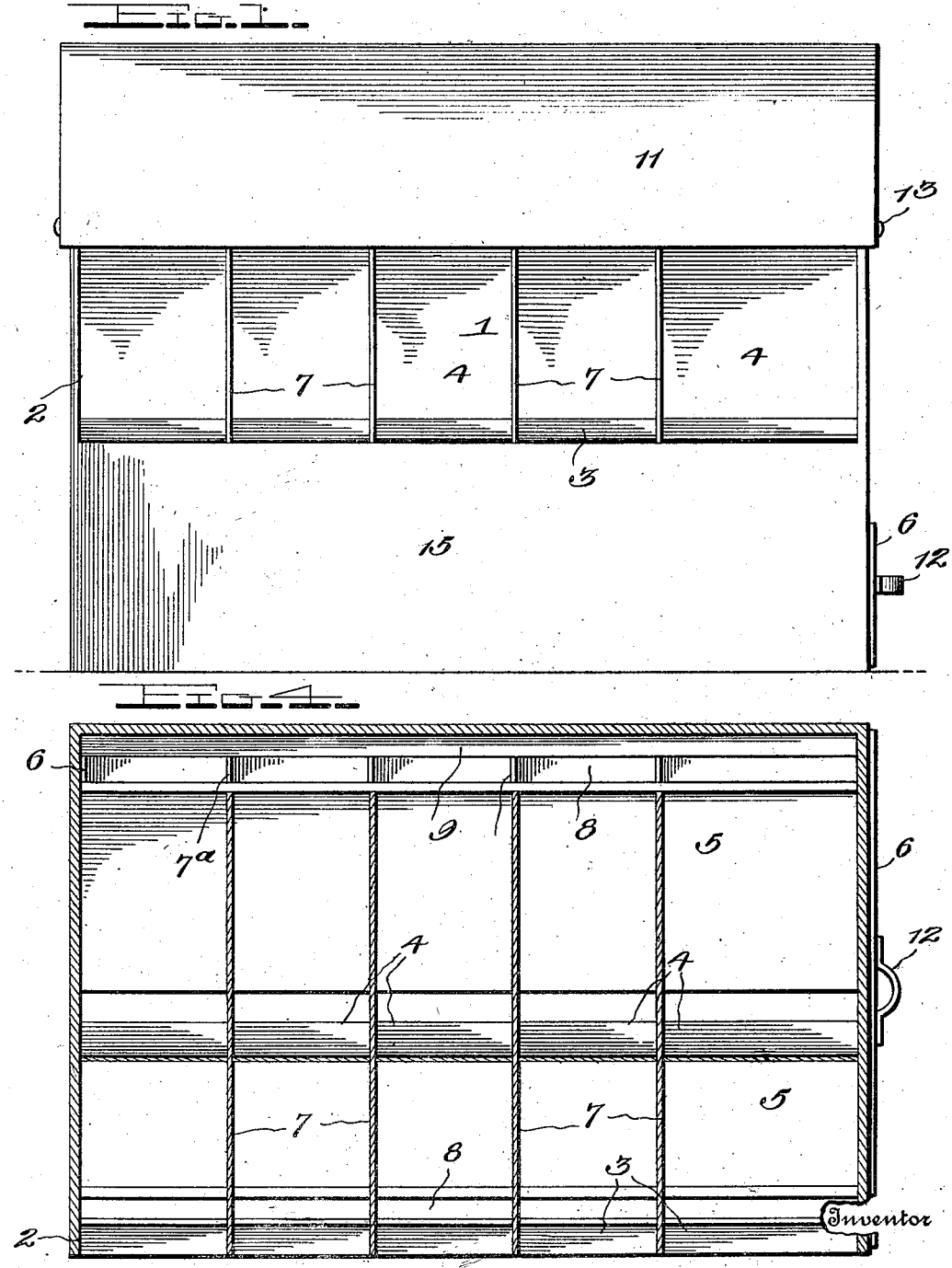

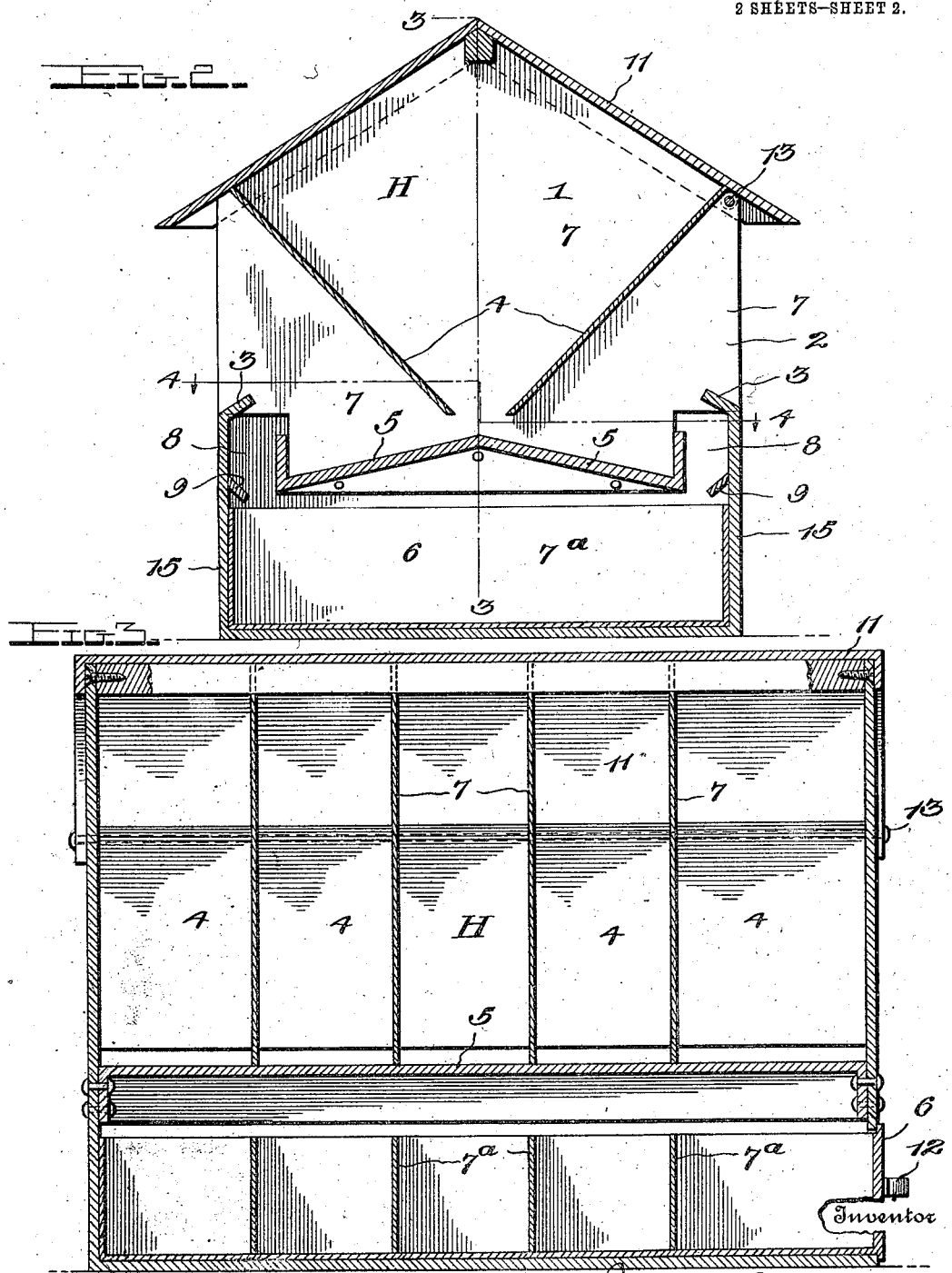

JAMES BEANE, OF CHARLESTON, WEST VIRGINIA.

ECONOMICAL FEEDER.

1,125,044. Specification of Letters Patent. Patented Jan. 19, 1915.

Application filed January 2, 1914. Serial No. 809,892.

*To all whom it may concern:*

Be it known that I, JAMES BEANE, a citizen of the United States, residing at Charleston, in the county of Kanawha and State of West Virginia, have invented a new and useful Economical Feeder, of which the following is a specification.

My invention relates to hoppers for feeding dry mash and the like and has for its object the provision of a feeder of improved and simplified construction for the ends to be attained and which is conveniently arranged for feeding poultry, etc.

It is also an object of my invention to combine with my feeder novel means for saving all meal or other feed billed or scattered out of the feeding member or feed traps by the poultry, and for making it possible to conveniently restore such feed to its proper compartment in the hopper.

Other objects of my invention are set forth in the descriptive portion of this specification and the accompanying drawings.

In the drawings, Figure 1 is a side view of the invention; Fig. 2 is a transverse sectional view; Fig. 3 is a longitudinal sectional view on line 3—3 of Fig. 2; and Fig. 4 is a horizontal sectional view on line 4—4 of Fig. 2.

Like characters of reference indicate like parts throughout the several views.

Referring to the accompanying drawings, which are illustrative of my invention, a hopper H is provided. This is formed by converging walls 4, and has a plurality of hopper chambers 1, formed by vertical partitions 7, for holding different kinds of feed. Beneath the mouth of the hopper are feed traps 5, to which feed may flow from the hopper to the portion of the feed trap accessible to the poultry. A guard member 3 extends longitudinally of the feeder, spaced substantially apart from the feed trap, on each side, and disposed in an upwardly-inclined position, as shown in Fig. 2, to keep food from being scratched out of the hopper.

In the base of the feeder is a drawer 6, extending the length of the device. It is divided into feed-saving compartments, by means of partitions 7ª, to correspond in location, viewed vertically, with the hopper chambers 1. A handle 12 is secured to the outer end of drawer 6. Longitudinal feed-guide rails 9 are positioned on the inner sides of the feeder just above the drawer 6, as illustrated in Fig. 2. A conduit 8 is provided between the feed trap 5 and the sides 15 of the feeder, through which feed billed out by the poultry may fall to the feed-saving compartment immediately below. The hopper is provided with an elevatable roof 11, or cover, which is hinged or pivotally mounted at one side of the feeder framework by means of a bolt 13.

The operation of the device is as follows: The roof or cover 11 is swung open and feed is deposited in the various hopper chambers. There may be one or more of these chambers, as, for example, one for beef scrap; another for charcoal; another for oyster shells; a fourth for grit; and a fifth for ground bone. The mouth of the hopper chamber (or chambers) 1 is positioned a little above the oblique side of the feed trap 5, so that feed is gradually supplied and distributed by gravity as it is needed. The guard member 3 prevents poultry from wasting feed. The feed that is billed out of the feed trap 5 by the poultry passes through conduit 8 to the vertically corresponding feed saving compartment in catch pan or drawer 6. Thus a considerable economy of feed is effected. Whenever desirable, the drawer 6 may be readily withdrawn by means of handle 12; the roof or cover 11 of the hopper swung open; and the contents of the various compartments poured back into the corresponding hopper chambers of hopper H. The replacing of the feed in its proper receptacle is thus accomplished conveniently by the one operation of pouring from the drawer 6.

In the preferred form of my invention, illustrated in the accompanying drawings, a device is provided which feeds from both sides of the feeder, thus doubling its feeding capacity over that of most feeders. But it is of course within the contemplation of my invention to provide a form of my device without this advantage, but which otherwise operates in a similar manner to that set forth above, feeding from one side only. Changes in the arrangement of the feed-saving compartments or in drawer 6 may also be made. The form of the invention above described I have, however found to possess distinct and important advantages over other forms which I have devised of a similar nature. Variations may also be made in the arrangement of compartments, their number, and of the material of which the feeder is constructed. Galvanized iron is, however the preferred material, as it is entirely sanitary, economical and advantageous for this purpose.

What I claim is:

1. A poultry feeder comprising a series of hopper chambers having converging walls, opposite feed traps disposed in opposite, downwardly-inclined position for the flow of feed from the hoppers to the outer portions of said feed traps, longitudinal, upwardly-inclined guard members spaced substantially apart from the aforesaid feed traps to prevent wasting of feed, a casing to which the aforesaid members are secured, a longitudinally removable drawer disposed in the base of the casing, the aforesaid drawer having a series of feed-saving compartments positioned with their walls in vertical alinement with those of the series of hopper chambers operatively communicating thereto, each of said compartments affording a common receptacle for overflow from opposite feed traps, and a pivotally mounted cover for the series of hopper chambers, whereby the overflow feed in the series of compartments in the drawer may be poured back into their proper hopper chambers by one operation.

2. In a feeder, the combination of a hopper having a plurality of hopper chambers, corresponding feed traps positioned beneath the mouths of the hopper chambers and accessible for feeding purposes, a guard member extending longitudinally of the feeder, spaced substantially apart from the feed trap and disposed in an upwardly inclined position to prevent wasting of the feed, a drawer in the base of the feeder, the aforesaid drawer having a plurality of compartments arranged to correspond in location with the hopper chambers, and conduits opening into the aforesaid compartments from the feed traps, the hopper and drawer having their respective partitions between compartments disposed in vertical alinement, for the purposes hereinbefore described.

3. In a feeder, the combination of a hopper having a plurality of hopper chambers, corresponding feed traps positioned beneath the mouths of the hopper chambers and accessible for feeding purposes, guard means extending longitudinally of the feeder spaced substantially apart from the feed trap to prevent wasting of the feed; means disposed parallel with the aforesaid guard means and therebeneath to guide feed in passing from the feed trap to compartments beneath; and a drawer in the base of the feeder having a plurality of feed-saving compartments arranged to correspond in location with the hopper chambers and in communication therewith, the hopper and drawer having their respective partitions between compartments disposed in substantially vertical alinement.

4. In a feeder, the combination of a hopper having a series of hopper chambers, opposite inclined feed traps operatively associated therewith and accessible from opposite sides of the feeder, vertical partitions separating the feeder into non-communicating main chambers including vertically alined portions of the feed trap and hopper chamber immediately above, a removable drawer in the base of the feeder, having partitions disposed in vertical alinement with the partitions separating corresponding compartments in the feeder, and means for preventing the throwing of feed from the feed trap, positioned above and at an angular relation thereto, substantially as set forth.

In testimony whereof, I hereunto affix my signature, in the presence of two witnesses.

JAMES BEANE.

Witnesses:
JOSEPH A. BELL,
E. F. GOFF.